D. M. WESTCOTT & H. M. VINCENT.
FOLDING BED FOR AUTOMOBILES.
APPLICATION FILED OCT. 4, 1915.
1,226,426.
Patented May 15, 1917.
3 SHEETS—SHEET 1.
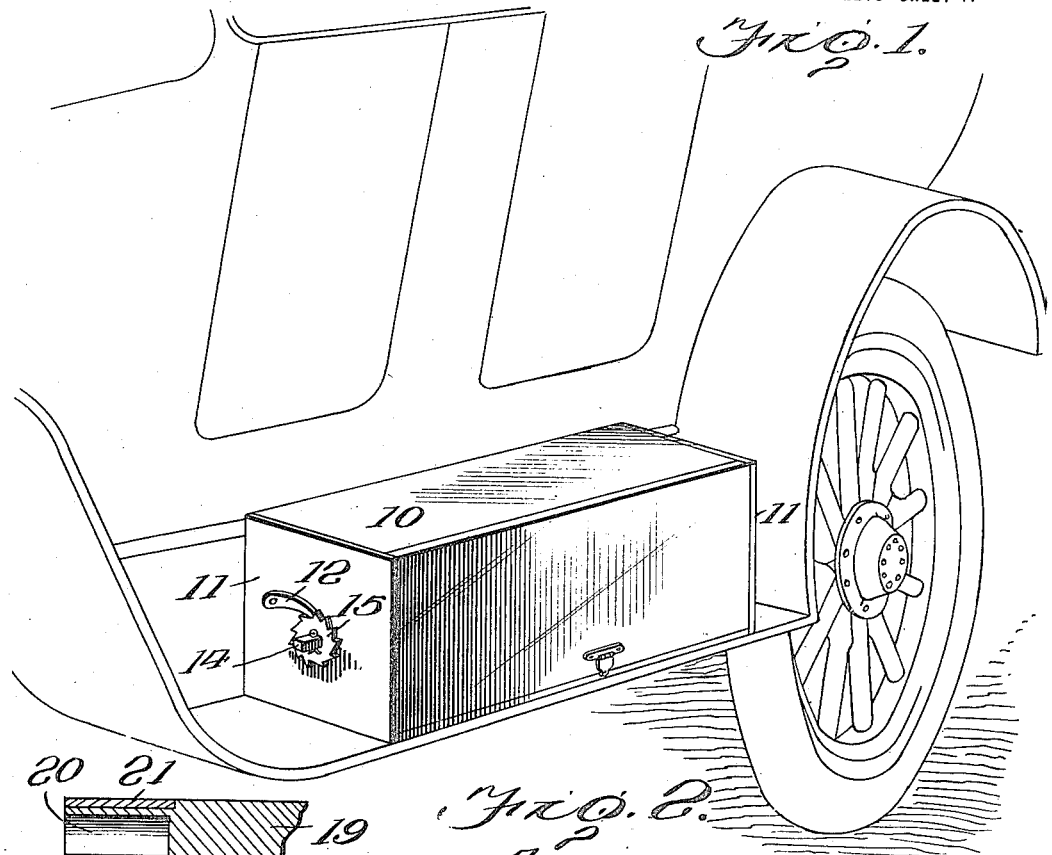
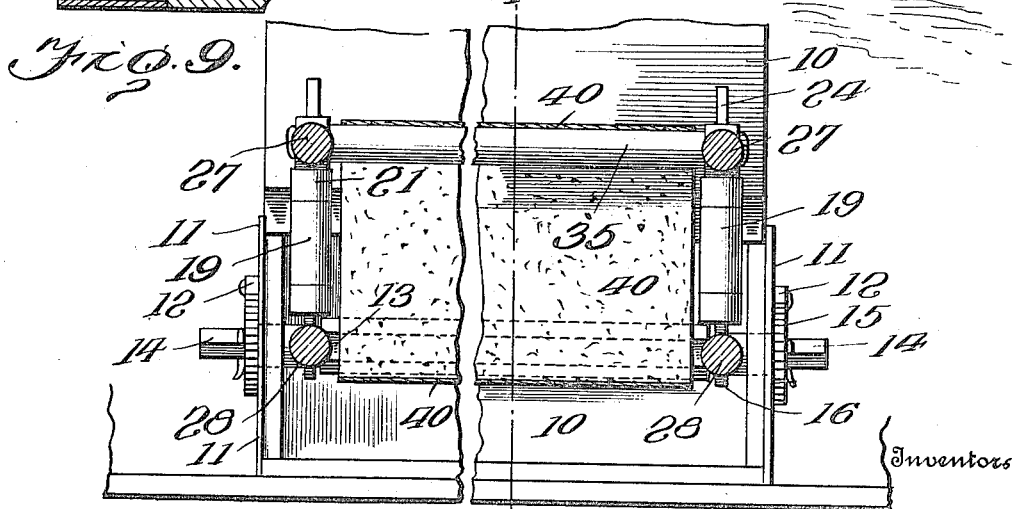
Inventors
D. M. Westcott and
H. M. Vincent.
By
Attorneys.

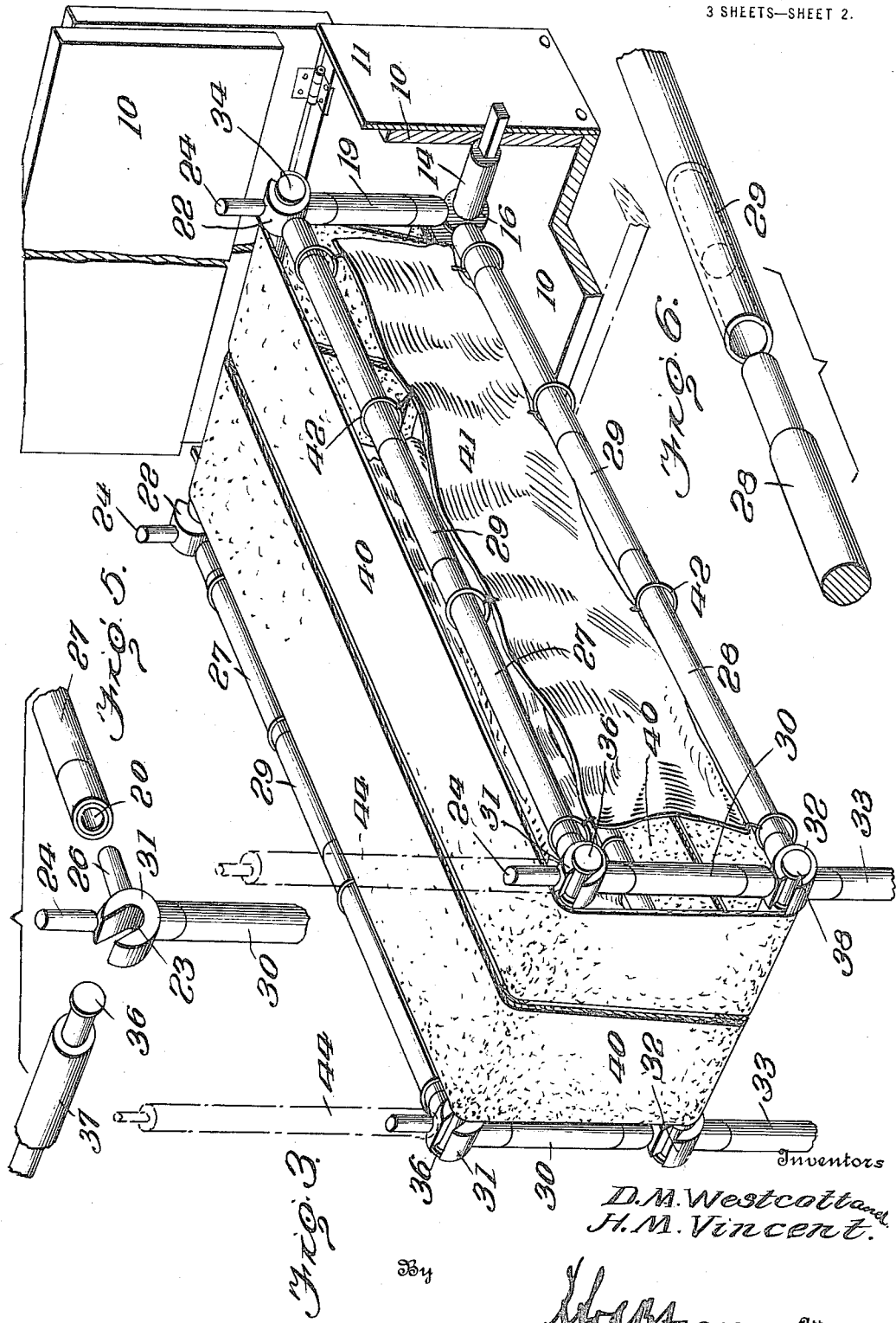

D. M. WESTCOTT & H. M. VINCENT.
FOLDING BED FOR AUTOMOBILES.
APPLICATION FILED OCT. 4, 1915.
1,226,426.
Patented May 15, 1917.
3 SHEETS—SHEET 3.
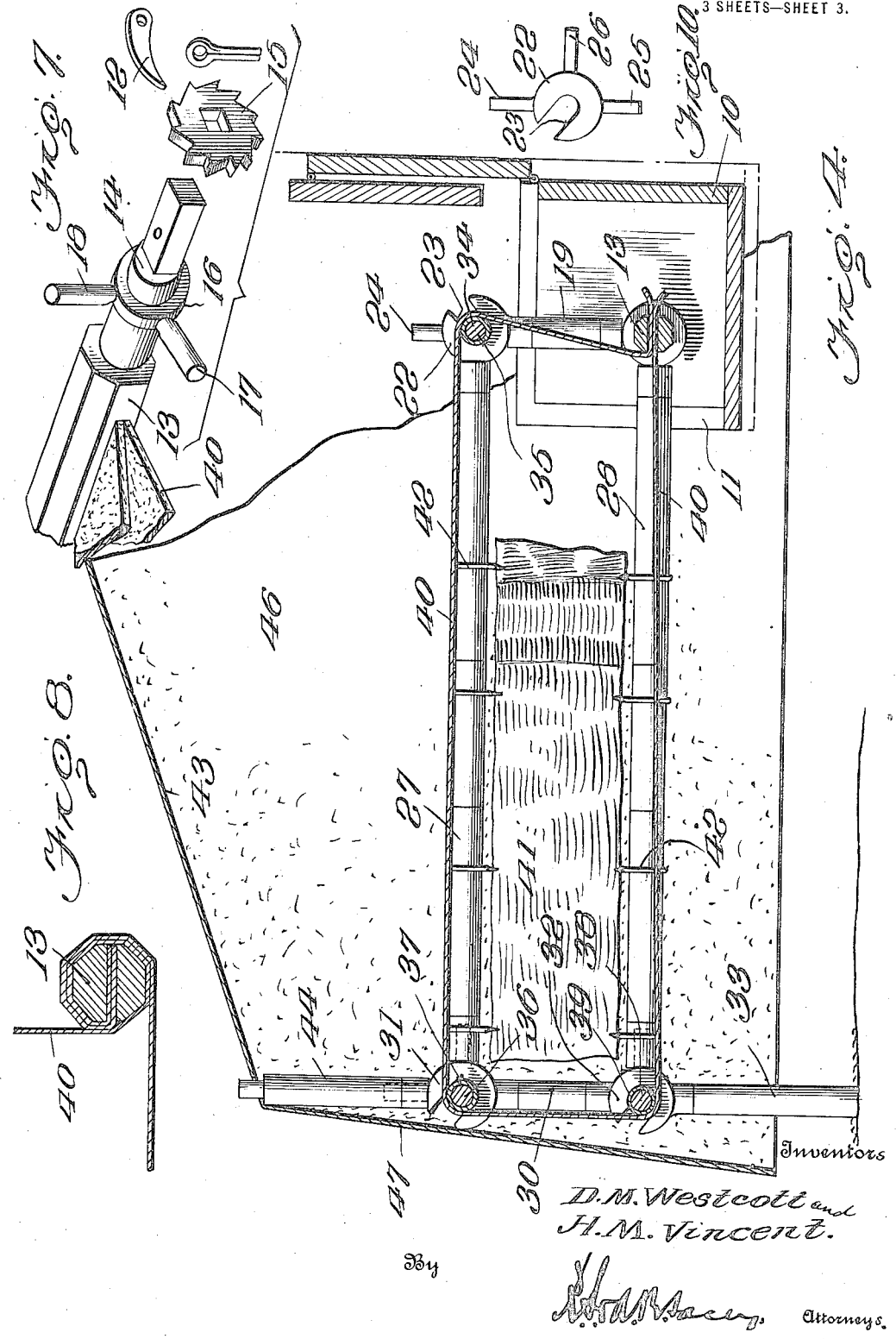
Inventors
D. M. Westcott and
H. M. Vincent.
By
Attorneys.

UNITED STATES PATENT OFFICE.

DELBERT M. WESTCOTT AND HARRY M. VINCENT, OF SAN LUIS OBISPO, CALIFORNIA.

FOLDING BED FOR AUTOMOBILES.

1,226,426.　　　　Specification of Letters Patent.　　Patented May 15, 1917.

Application filed October 4, 1915. Serial No. 54,004.

*To all whom it may concern:*

Be it known that we, DELBERT M. WESTCOTT and HARRY M. VINCENT, citizens of the United States, residing at San Luis Obispo, in the county of San Luis Obispo and State of California, have invented certain new and useful Improvements in Folding Beds for Automobiles, of which the following is a specification.

This invention contemplates an improved foldable bed and has as its primary object to provide a device of this character particularly adapted for use in connection with an automobile, being designed to form a part of the equipment of the automobile and so arranged thereon that when desired, the bed may be readily set up for use.

The invention has as a further object to provide a device of this character which will be light and which may be folded into minimum space and disposed within a suitable box or casing mounted upon one step of the automobile.

And a still further object of the invention is to provide an improved device of this character wherein the several elements of the knock-down frame of the bed will be held in assembled operative relation by a single strip of material wound upon the frame to provide upper and lower reaches upon which the occupants of the bed may lie and adjustable so that the said reaches may be maintained taut.

Other and incidental objects will appear as the description proceeds and in the drawings wherein we have illustrated the preferred embodiment of the invention and wherein similar reference characters designate corresponding parts throughout the several views.

Figure 1 is a perspective view showing the casing of my improved bed mounted upon one running board of a conventional type of automobile, the bed being folded and disposed within the casing, Fig. 2 is a transverse sectional view taken through the bed when set up, Fig. 3 is a perspective view showing the bed set up and particularly illustrating the manner in which the several elements of the bed frame are assembled, Fig. 4 is a longitudinal sectional view taken on the line 4—4 of Fig. 2 showing the arrangement of the strip of material employed upon the bed frame whereby the said strip of material forms the upper and lower reaches of the bed and also illustrating in fragmentary section, the canopy for the bed, Fig. 5 is a fragmentary perspective view of one of the foot-posts of the bed and particularly illustrating the manner in which the side and end rails of the bed frame are connected with the said foot-post, Fig. 6 is a fragmentary perspective view illustrating the connection between the sections of the side rails of the frame, Fig. 7 is a similar view of one end of the drum which carries the length of material forming the reaches of the bed and also illustrating the mounting of the angle members upon the said drum which receive the adjacent extremities of the side rails of the bed frame and the head post thereof, Fig. 8 is a transverse sectional view taken through the drum showing the manner in which the length of material carried thereby is adapted to be wound about the drum, Fig. 9 is a fragmentary sectional view showing the type of socket employed in detachably connecting certain of the elements of the bed frame, Fig. 10 is a detail view of one of the angle members employed in connection with the bed frame.

In carrying out our invention, we employ a rectangular box or casing 10 of a width to fit upon one running board of an automobile, as conventionally illustrated in Fig. 1 of the drawings. The casing 10 is preferably formed of wood although any other suitable material may be employed and is provided with a hingedly mounted top wall to the free longitudinal edge of which is hingedly connected the outer side wall of the casing as more particularly shown in Fig. 4, the said walls being movable to the position illustrated in this figure for permitting free access to the interior of the casing. Connected to the end walls of the casing are metal plates 11, upon the outer sides of which are pivotally mounted pawls 12.

Arranged to extend longitudinally within the casing is a drum 13 provided at its extremities with trunnions 14 extending freely through the end walls of the casing and journaled therein. The outer ends of the trunnions are squared and receive ratchets 15 adapted to coact with the pawls 12. Freely mounted upon the trunnions 14 at opposite ends of the drum are angle members 16 including collars surrounding the trunnions, and from each of which extend, at substantially right angles to each other, lugs 17 and 18 respectively.

Detachably connected to the lugs 18 are the head posts 19 of the bed frame. The posts 19, at opposite ends thereof, are provided with sockets 20 similar to that shown in Fig 9, the said posts being axially bored to provide the sockets and being surrounded at their extremities by suitable ferrules 21. The lugs 18 are received within the sockets 20 at the lower ends of the said posts and detachably mounted within the sockets at the upper ends thereof are angle members 22 which are preferably formed of metal and are each in the nature of a split ring, being provided with sockets 23 as more particularly shown in Fig. 10. Extending in opposite directions from each of the said members are diametrically arranged lugs 24 and 25 respectively while a similar lug 26 projects from each of the said members from the side thereof opposite the open side of the socket 23 provided therein and is arranged at substantially right angles to the lugs 24 and 25.

The lugs 25 of the angle members 22 are received within the sockets 20 at the upper ends of the posts 19 and detachably connected to the said angle members and to the angle members 16 are the upper and lower side rails 27 and 28 respectively of the bed frame. The upper and lower side rails are substantially identical in construction and are each formed in sections detachably connected by a sleeve 29 fixed to one end of one of the sections and receiving the reduced end of the other section. At their ends, the several rails are provided with sockets similar to the socket 20 heretofore described and the lugs 26 of the angle members 22 are received within the sockets at the adjacent ends of the side rails 27 while the lugs 17 of the angle members 16 are received within the sockets at the adjacent ends of the side rails 28.

Supporting the outer extremities of the side rails 27 and 28 are the foot-posts 30 substantially equal in length to the length of the head posts 19 and identical therewith, being provided at their ends with sockets similar to the sockets 20 previously described. The sockets at the upper ends of the said posts detachably receive corresponding lugs of angle members 31 identical in construction with the angle members 22 while the sockets at the lower extremities thereof detachably receive corresponding lugs of angle members 32 also identical in construction with the angle members 22. The lugs 26 of the angle members 31 are detachably received within the sockets at the outer extremities of the upper rails of the bed frame while the lugs 26 of the angle members 32 are detachably received within the sockets at the outer extremities of the lower side rails 28.

Assuming the casing 10 to be attached to the running-board of an automobile, as illustrated in the drawings, the side rails of the bed frame will, of course, project laterally from the automobile similar to the manner illustrated in Fig. 4, and it therefore becomes necessary to support the outer end of the frame from the ground or other surface. For this purpose, we provide legs 33 which, at their upper extremities, are provided with sockets similar to the sockets 20 shown in Fig. 9, which detachably receive the lugs 25 of the angle members 32.

Extending between the angle members 22 is a cross-piece or connecting rod 34 which is received at its extremities within the sockets 23 of the said angle members and is terminally headed to engage with the said angle members. Freely mounted upon the said rod is a spacer sleeve or roller 35. A connecting rod 36 identical with the rod 34 is detachably received within the sockets 23 of the angle members 31 and is provided with a spacer sleeve 37, while a similar connecting rod 38 is detachably received within the sockets of the angle members 32 and is provided with a spacer sleeve or roller 39, the sockets of the angle members 31 and 32 being presented in a direction opposite to the sockets of the angle members 22.

A rectangular bed frame is thus provided which may be readily set up and the elements of which may be as quickly disconnected from each other to be disposed within the casing 10. Connected at its extremities with the drum 13, is a length of canvas or other suitable material 40 of a length to embrace the bed frame when set up to engage with the sleeves 35, 37, and 39, of the connecting rods of the frame as more particularly shown in Fig. 4. It will now be clear that by applying a wrench or other suitable tool to the terminals of the trunnions of the drum 13, the drum may be easily rotated to wind the canvas upon the drum and consequently draw it taut about the bed frame so that the said canvas will thus serve to hold the several elements of the bed tightly in engagement with each other to provide a rigid structure.

Attention is now directed to the fact that the canvas 40 when disposed upon the frame will also provide upper and lower reaches between the upper and lower side rails of the bed frame respectively and each providing a bed surface. Preferably, the canvas will be of such width that each of the reaches thereof will accommodate two persons. Should the weight of the persons occupying the bed tend to sag the canvas, the reaches of the bed may be easily drawn taut by properly rotating the drum 13 which will be held against retrograde movement by the pawls 12 in coöperation with the ratchets 15.

Preferably, we provide curtains 41 at opposite sides of the bed, the said curtains being slidably connected by rings 42 to the upper and lower side rails of the bed frame and easily movable to screen the lower reach of the bed as more particularly shown in Figs. 3 and 4 so that anyone occupying the said reach of the bed may have entire privacy.

Arranged to fit over the entire bed, is a canopy 43 which, at one end, is suitably connected to the top of the automobile and the opposite end of which is supported by extensions 44 carried by the angle members 31 of the bed frame. The extensions 44, at the inner extremities thereof, are provided with sockets similar to the socket 20 shown in Fig. 9 which detachably receive the lugs 24 of the said angle members, while the upper extremities of the said extensions are reduced to project through suitable openings formed in the canopy, so that the canopy will be supported in position to depend around the bed frame. Preferably, the canopy is provided with side flaps 46 which confront the sides of the bed and an end flap 47 which depends over the end of the bed. If desired, extensions similar to the extensions 44 may be connected to the lugs 24 of the angle members 22 to support the canopy at its inner end.

It will now be seen that persons touring in an automobile may, at nightfall, set up the bed of the present invention without difficulty and will be protected from the elements when sleeping therein. When it is desired to continue the journey, the several elements of the bed may as easily be disconnected and packed within the casing and the casing closed as illustrated in Fig. 1 to thus protect the bed during transit. In order to make the structure as light as possible, the posts of the bed frame, the legs and the side rails thereof are preferably formed of wood as are also the extensions for supporting the canopy. However, as will be readily understood, this is purely a matter of choice and any other suitable material may be substituted therefor.

Having thus decsribed our invention, what we claim and desire to secure by Letters Patent is:

1. A device of the character described including a bed frame, and a flexible element looped around the frame to form upper and lower reaches respectively providing upper and lower bed surfaces.

2. A device of the character described including a casing, a drum arranged within the casing, a bed frame associated with the drum with the head posts of the bed frame supported by the drum, and a flexible element adapted to be wound upon the drum and looped about the frame to form a reach providing a bed surface.

3. A device of the character described including a casing, a drum journaled in the casing, a collapsible bed frame adapted to be received within the casing and supported at one extremity upon the drum, and a flexible element carried by the drum and engaged with the bed frame to form a reach providing a bed surface.

4. A device of the character described including a bed frame having coacting upper and lower frame members, and a flexible element carried by one of said frame members and looped around the other of said frame members to form upper and lower reaches respectively providing upper and lower bed surfaces.

5. A device of the character described including a collapsible bed frame having head posts, foot posts, and side and end rails arranged to provide upper and lower bed levels, and a flexible element carried by the frame for holding the posts and rails thereof in assembled relation with the said flexible element forming upper and lower reaches respectively providing bed surfaces at the said levels.

6. A device of the character described including a bed frame having head posts, foot posts, side rails, a rotatably mounted drum, angle members carried by said drum and connecting the head posts with the side rails, angle members connecting the foot posts with the side rails, a cross-piece extending between the angle members of the foot posts, and a flexible element wound upon said drum and connected to said cross-piece to form a reach providing a bed surface.

In testimony whereof, we affix our signatures.

DELBERT M. WESTCOTT. [L. S.]
HARRY M. VINCENT. [L. S.]